July 24, 1934.  J. F. WALLACE  1,967,641
HYDROPNEUMATIC SHOCK ABSORBER
Original Filed June 26, 1931
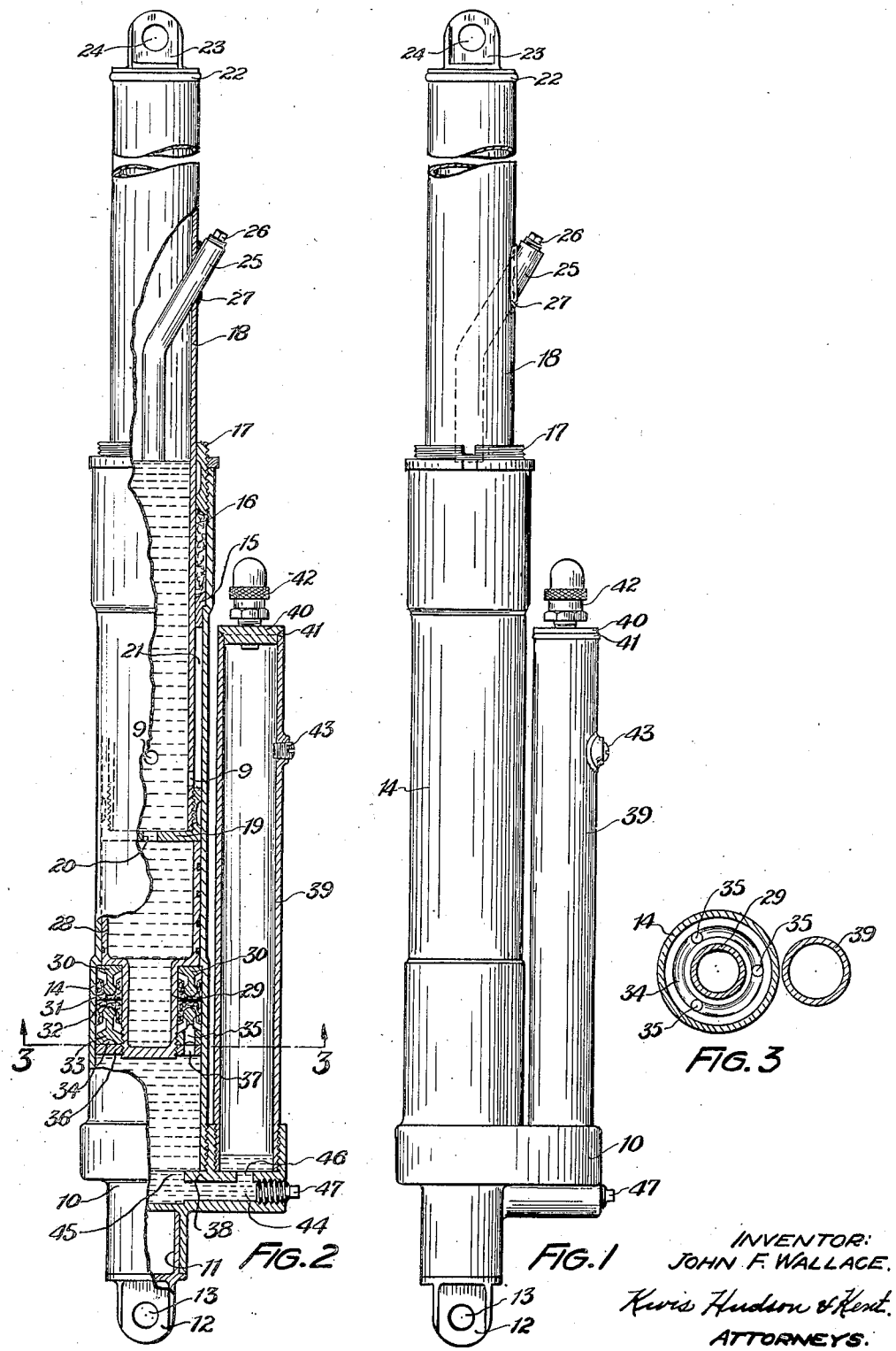
INVENTOR:
JOHN F. WALLACE.
ATTORNEYS.

Patented July 24, 1934

1,967,641

UNITED STATES PATENT OFFICE 1,967,641

HYDROPNEUMATIC SHOCK ABSORBER

John F. Wallace, Cleveland, Ohio, assignor to The Cleveland Pneumatic Tool Company Cleveland, Ohio, a corporation of Ohio Application June 26, 1931, Serial No. 546,974
Renewed October 26, 1933

8 Claims. (Cl. 267—64)

This invention relates to improvements in hydro-pneumatic shock absorbers for aircraft.

One of the objects of the invention is the provision of a novel type of shock absorber wherein the resilience of air and the dashpot effect of flowing liquid supplement each other on the impact or telescoping stroke.

Another object is the provision of a hydropneumatic shock absorber so constructed that the big end may be at the bottom.

A further object is the provision of a shock absorber of the character described, wherein the compressed air chamber is separate from the main cylinder and mounted behind it in a position such that the assembly lends itself readily to streamlining.

Other objects and features of novelty will appear as I proceed with a description of that embodiment of the invention which, for the purposes of the present application, I have illustrated in the accompanying drawing, wherein Figure 1 is an elevational side view of a shock absorber embodying the invention.

Fig. 2 is a similar view with some of the parts broken away and others shown in central longitudinal section, in order to more fully disclose the invention, and Fig. 3 is a cross sectional detail view taken substantially on the line 3—3 of Fig. 2.

In the drawing I have shown at 10 a forged bracket, into the lower end of which is set and suitably secured a smaller forging 11 having a pair of ears 12 depending therefrom and provided with openings 13 therein for the reception of fastenings by means of which the bracket may be attached to one of the parts whose relative movements are to be cushioned.

This bracket comprises an internally threaded upwardly extending socket within which is mounted a cylinder 14 which is somewhat larger in diameter at its ends than in its intermediate portion. On the shoulder formed at the intersection of the intermediate and upper portions of the cylinder 14 there is supported a packing ring 15 above which is mounted packing 16, a gland nut 17 being threaded into the cylinder, by means of which the packing may be compressed to the desired extent and retained in position.

Slidable within the packing 16 is a piston tube 18, on the lower extremity of which is threaded a piston head 19 having an oil metering port 20 centrally located therein. The outer side wall of the piston head 19 is finished to have a snug sliding fit within the smaller central portion of the cylinder 14. Between the piston tube 18 and the wall of the cylinder 14 there is thus provided an annular space 21 which varies in extent as the piston moves up and down. Communication is provided between the interior of piston tube 18 and the space 21 by means of ports 9 in the tube. The upper end of the piston tube 18 is closed by a cap 22 from which ears 23 extend upwardly, these ears having openings 24 therein for the reception of fastenings by means of which the piston tube 18 may be attached to the other of the two parts whose relative movements are to be cushioned. Through one side of the piston tube 18 an opening is formed for the reception of an oil filler pipe 25 having a screw plug 26 at its upper exposed end. The joint between the pipe 25 and the piston tube 18 is preferably closed by means of a weld 27.

Beneath the main piston 18, 19 there is a floating piston 28 which is open at the top, and has a constricted lower portion 29 closed at its lower extremity. A packing surrounds the constricted portion 29. While this packing may be of any one of various forms, I prefer that illustrated in the drawing, wherein there is an upper annular metallic member 30 which in cross section resembles the rail of a railroad track, but has a head portion that is partially circular in contour which engages within an annular packing ring 31 that is U-shaped in cross section. A second packing ring 32 of identical form is arranged back to back with the packing ring 31 and is engaged by a metallic ring 33 similar in form to the ring 30, but provided on its lower surface with an annular groove 34 with which communicate one or more openings 35 which run out on either side of the ring at the upper part of the base surface thereof. The packing is adjusted and held in place by a lock ring 36 which is threaded upon the lower extremity of the constricted part 29 of the floating piston. The ring 36 is provided with one or more ports 37 communicating with the groove 34, so that oil under pressure may pass through the ports 37, groove 34, and passages 35 into the space above the ring 33, and exert outward pressure upon the sides of the packing ring 32. It will be observed that the metallic ring 30 extends outwardly a slight distance beyond the surface of the larger portion of the floating piston, and is adapted to cooperate with the shoulder formed in the cylinder 14 at the juncture between the central and lower portions thereof to constitute a stop limiting the upward motion of the floating piston. The downward movement thereof is limited by the engagement of the ring 36 with a flat wall portion 38 of the bracket 10.

In the bracket 10, in a position directly to the rear of the cylinder 14, I mount a compressed air cylinder 39, which is of a cross section relatively small as compared with that of cylinder 14. This cylinder 39 is closed at its upper end with a cap 40 secured to the cylinder by a weld 41 or other suitable means. In the cap 40 I mount an automatic air valve 42 of known construction. At a suitable distance down from the top of the cylinder 39 there is an oil filler opening, which is closed by a threaded plug 43.

The bracket 10 has formed therein a laterally extending oil passage 44, with which communicate openings 45 and 46 leading to the interiors of cylinders 14 and 39 respectively, these openings 45 and 46 being preferably located centrally of their respective cylinders. The passage 44 may be conveniently closed by a screw plug 47.

*Operation.*—When the shock absorber is assembled upon an airplane, the plug 26 is removed and oil or other suitable liquid is poured into the filler tube 25. At this time the floating piston 28, 29 and the main piston 18, 19 are at their lower limits of travel. The interior of floating piston 28, 29 becomes entirely filled with such liquid, flowing into it through the port 20 in the piston head 19, the annular space 21 becomes entirely filled by liquid which flows into it through the ports 9, and the piston tube 18 becomes filled up to the lower level of tube 25, which thus acts as a gauge to prevent the filling of the strut beyond the desired extent. Plug 26 is then replaced, and plug 43 is removed. Oil is then poured through the opening for the latter plug until the cylinder 39 is filled up to that level, whereupon the plug 43 is replaced and air is pumped into the upper end of cylinder 39 through automatic valve 42. This inflation of the cylinder 39 is continued until the pressure therein is sufficient to force the oil downwardly through port 46 and passage 44 and upwardly through port 45 into the lower end of cylinder 14, raising the two pistons approximately to the position illustrated in Fig. 2. The strut is then in condition for use. When the aircraft is in the air the weight of the running gear attached to the ears 12 will act to expand the strut to the limit of its motion, that is until the head 19 of the main piston engages the ring 15 on the cylinder. Now, when the running gear of the aircraft in making a landing strikes the ground, a blow is delivered to the strut which tends to cause the pistons and cylinder to be telescoped together. The oil in the cylinder above the floating piston 28 is thereby metered through port 20 into the piston tube 18, and to some extent through ports 9 into annular space 21. However, if the blow is very sharp, some of the force tending to push the piston head 19 downwardly will be transmitted through the oil in and above the floating piston 28 to the head of that piston, and thence to the oil column below the floating piston by which it is transmitted to the column of compressed air in cylinder 39, whereby the heavy shock is cushioned. There is thus provided in my strut a combination shock absorbing effect consisting partially of the soft cushioning action of a column of compressed air and partially of the dashpot action of oil flowing through a constricted opening 20. When the piston head 19 has descended far enough to engage the floating piston 28, the two pistons move downwardly together and any further impact force is absorbed exclusively by the air column.

On the rebound stroke, the heavy pressure of compressed air does not act through the complete stroke, but must spend itself by the time the floating piston 28 returns to the position illustrated in Fig. 2. Thereafter there may be a further relative upward movement of the piston tube 18 which, however, is checked to a considerable extent by the metering of liquid through the ports 20 and 9.

In taxiing, when the weight of the aircraft is supported upon the struts, the piston head 19 will be in engagement with the floating piston 28, and the impact shocks will be absorbed by the air column exclusively.

In the foregoing description I have necessarily gone somewhat into detail in order to explain fully the particular embodiments of the invention herein illustrated, but I desire it to be understood that such detail disclosures are not to be construed as amounting to limitations, except as they may be included in the appended claims.

Having thus described my invention, I claim:

1. In a hydro-pneumatic shock absorber, a cylinder with its open end extending upwardly, a piston slidable therein having an oil port through the head thereof, means for connecting said cylinder and piston respectively to the parts whose movements are to be cushioned, a floating piston interposed between the first named piston and the lower end of said cylinder, and a compressed air chamber having communication with the lower end of said cylinder.

2. In a hydro-pneumatic shock absorber, a cylinder with its open end extending upwardly, a piston slidable therein having an oil port through the head thereof, means for connecting said cylinder and piston respectively to the parts whose movements are to be cushioned, a floating piston interposed between the first named piston and the lower end of said cylinder, means for limiting the upward travel of said floating piston, and a compressed air chamber having communication with the lower end of said cylinder.

3. In a hydro-pneumatic shock absorber, a cylinder with its open end extending upwardly, a piston slidable therein having an oil port through the head thereof, means for connecting said cylinder and piston respectively to the parts whose movements are to be cushioned, a floating piston interposed between the first named piston and the lower end of said cylinder, means for limiting the upward travel of said floating piston, oil in said cylinder both above and below said floating piston, and a compressed air chamber having communication with said cylinder below the point of lowest travel of said floating piston, the quantity of oil below the floating piston being sufficient to extend into said chamber when the floating piston is at the upward limit of its travel.

4. In a hydro-pneumatic shock absorber, a cylinder with its open end extending upwardly, a piston slidable therein having an oil port through the head thereof, means for connecting said cylinder and piston respectively to the parts whose movements are to be cushioned, a floating piston interposed between the first named piston and the lower end of said cylinder, packing carried by said floating piston bearing against said cylinder, and a compressed air chamber having connection with the lower end of said cylinder.

5. In a hydro-pneumatic shock absorber, a bracket for attachment to one of the parts whose movements are to be cushioned, a cylinder mounted therein and extending upwardly therefrom, a piston slidable in said cylinder and having at its upper end means for attachment to the other of the parts whose relative movements are to be cushioned, said piston having an oil metering port therethrough, and a cylindrical air chamber mounted in said bracket directly behind said cylinder and extending upwardly parallel to the cylinder, said bracket having a passage therein for joining the interior of the said cylinder with the interior of the said chamber.

6. In a hydro-pneumatic shock absorber, a cylinder, a piston slidable therein having an oil port through the head thereof, means for connecting said cylinder and piston respectively to the parts whose movements are to be cushioned, a floating piston enclosed by said cylinder and interposed between the first named piston and the closed end of said cylinder, and a compressed air chamber at that end of the shock absorber which is adjacent the closed end of the cylinder, said chamber being adapted to contain air to be compressed and expanded by the relative movements of said floating piston and cylinder.

7. In a hydro-pneumatic shock absorber, a cylinder having one closed end, a piston in said cylinder, means for connecting said cylinder and piston respectively to the parts whose movements are to be cushioned, a floating piston located entirely within the cylinder and having its head between the head of the first named piston and the closed end of the cylinder, one of said pistons having a constricted liquid passage therethrough and a compressed air chamber at the closed end of the cylinder.

8. In a hydro-pneumatic shock absorber, a cylinder having one closed end, a piston in said cylinder, means for connecting said cylinder and piston respectively to the parts whose movements are to be cushioned, a floating piston located entirely within the cylinder and having its head between the head of the first named piston and the closed end of the cylinder, one of said pistons having a constricted liquid passage therethrough permitting differential movement between the two pistons, a compressed air chamber at the closed end of the cylinder, and means for limiting the movement of the floating piston in a direction away from the closed end of the cylinder.

JOHN F. WALLACE.